United States Patent [19]

Fukuda et al.

[11] 4,052,329

[45] Oct. 4, 1977

[54] METHOD OF PREPARING CERIUM-ACTIVATED YTTRIUM SILICATE PHOSPHOR

[75] Inventors: Yoji Fukuda; Fumio Fukushima, both of Neyagawa; Yoshinobu Tsujimoto, Kashiwara; Masakazu Fukai, Nishinomiya; Shinji Sugai, Suita, all of Japan

[73] Assignee: Matsushita Electric Industrial Co., Ltd., Kadoma, Japan

[21] Appl. No.: 693,930

[22] Filed: June 7, 1976

Related U.S. Application Data

[63] Continuation-in-part of Ser. No. 447,817, March 4, 1974, abandoned.

[30] Foreign Application Priority Data

Mar. 2, 1973 Japan .................................. 48-24951
Aug. 28, 1973 Japan .................................. 48-96822

[51] Int. Cl.$^2$ ............................................ C09K 11/46
[52] U.S. Cl. ............................................ 252/301.4 F
[58] Field of Search ................................. 252/301.4 F

[56] References Cited

U.S. PATENT DOCUMENTS

| | | | |
|---|---|---|---|
| 2,975,143 | 3/1961 | Hoekstra | 252/301.4 F X |
| 3,157,602 | 11/1964 | Ropp | 252/301.4 F X |
| 3,523,091 | 8/1970 | McAllister | 252/301.4 F |
| 3,814,967 | 6/1974 | Takata et al. | 252/301.4 F X |

OTHER PUBLICATIONS

Bondar et al., "Isv. Akad. Nauk SSSR, Ser. Fiz", 33(6) pp. 1057-1061, 1969.
Morozova et al., "Chem. Abstracts", vol. 71, 1969, p. 65732a.
Fukuda et al., "Chem. Abstracts", vol. 81, 1974, p. 179786h.

*Primary Examiner*—Jack Cooper
*Attorney, Agent, or Firm*—Cushman, Darby & Cushman

[57] ABSTRACT

In the firing of a cerium-activated $Y_2O_3$-$SiO_2$ system phosphor such as $Y_2SiO_5$:Ce and $Y_2Si_2O_7$:Ce, the improvement of adding $BaF_2$ in a mol ratio of $BaF_2/Y_2O_3$ of 0.01-0.1 is disclosed which increases the luminosity, emission intensity or both of the phosphor. Phosphors having improved properties are conveniently prepared according to the disclosed process.

3 Claims, 4 Drawing Figures

METHOD OF PREPARING CERIUM-ACTIVATED YTTRIUM SILICATE PHOSPHOR

CROSS-REFERENCE TO RELATED APPLICATIONS

This application is a continuation-in-part of our earlier copending application Ser. No. 447,817, filed Mar. 4, 1974, now abandoned.

BACKGROUND OF THE INVENTION

This invention relates to an improvement in the process of making a cerium-activated yttrium silicate phosphor of the fast decay type.

Fast decay phosphors have important roles as phosphors for flying spot scanner tubes used in EVR (Electric Video Recording) and index color tubes used in information processing. In a flying spot scanner tube, unlike the television picture tube, a spot on the luminous screen is not modulated but is of constant luminosity and only scans at very high speed. The light from such a flying spot is converged through an optical system and scans a picture or pattern on a film or sheet; the light passing through the film or reflected from the sheet is transformed into a time-sequential electric signal.

For the light source of such a flying spot, the fast decaying characteristic is an important factor. Also, in certain applications, the spectrum distribution is an important characteristic. For instance, for obtaining an electric signal of a color film, the flying spot source should have a spectrum distribution to cover the three principal colors in order to generate three electric signals corresponding to the principal colors. Further, when scanning a monochromic (e.g. black and white) picture or pattern, a high luminosity is preferable for monitoring with the naked eye.

It has been known that cerium-activated phosphors, for instance $Ca_2MgSiO_7:Ce$, $Ca_2Al_2SiO_7:Ce$, $YPO_4:Ce$, $Y_3(Al,Ga)_5O_{12}:Ce$, $Y_2SiO_5:Ce$ and $Y_2SiO_7:Ce$, have a fast decaying emission at the electron beam excitation. However, with the exception of $Y_3(Al,Ga)_5O_{12}:Ce$, which emits yellow light, these phosphors emit only near-ultraviolet light or near-ultraviolet blue light and none are satisfactory as a phosphor for a color flying-spot tube, nor are they satisfactory even as a blue-emitting phosphor component of a white light flying spot tube.

In 1969, A. H. Gomes & A. Brill reported on Ce-activated yttrium silicates $Y_2SiO_5:Ce$ and $Y_2Si_2O_7:Ce$. The $Y_2Si_2O_7:Ce$ phosphor has its peak emission at around 380 nm and has the highest energy conversing efficiency among the above-mentioned Ce-activated phosphors. The $Y_2SiO_5:Ce$ phosphor has the second highest energy-conversion efficiency and its peak in the spectrum curve is at around 400 nm.

In the past, these Ce-activated yttrium silicate phosphors have been made by firing a mixture of oxides of the necessary component materials in the required mol quantities in the air or in a reducing atmosphere. During the firing of these phosphors, $YF_3$ (yttrium fluoride) was conventionally used as a mineralizer or flux for accelerating the reaction but it was found difficult to obtain a single composition of $\beta$-$Y_2Si_2O_7$:Ce, that is, one consisting of only $\beta$-phase composition excluding the components of the other phases.

SUMMARY OF THE INVENTION

The present invention provides novel processes for preparing Ce-activated yttrium silicate phosphors and the resulting novel cerium-activated yttrium silicate phosphors.

BRIEF DESCRIPTION OF THE DRAWINGS

The present invention is further explained in the following description and the accompanying drawing in which.

DETAILED DESCRIPTION OF THE INVENTION

The present invention is based on the emperical finding that the luminosity of $Y_2SiO_5:Ce$ phosphor is greatly improved when the materials required are mixed and fired with the addition of $BaF_2$, and the obtainment of a single composition of $\beta$-$Y_2SiO_2O_7$ is facilitated. This results in an improvement in emission intensity (hereinafter defined as the value of height of the peak) when the mixed materials are fired with the addition of $BaF_2$. The amount of $BaF_2$ depends upon the quantity of the other materials present and, preferably, is expressed as a ratio of the $Y_2O_3$ present; thus, the ratio of $BaF_2$ to $Y_2O_3$ is in the range of 0.01–0.1.

Among the yttrium silicates, as phosphor host (or matrix), $Y_2SiO_5$ (namely, $SiO_2/Y_2O_3 = 1$) and the $\alpha$, $\beta$, $\gamma$ and $\delta$ phases of $Y_2Si_2O_7$ (namely, $SiO_2/Y_2O_3 = 2$) are known. Of these yttrium silicates, the present invention relates to phosphors of $Y_2SiO_5:Ce$ and $\beta$-$Y_2Si_2O_7:Ce$.

The phosphors of the present invention is prepared by firing a mixture of $Y_2O_3$, $SiO_2$, $CeO_2$ and $BaF_2$ according to the disclosed method. In this method, the nominal stoichiometric mol ratio of the component materials $SiO_2$ and $Y_2O_3$ is $SiO_2/Y_2O_3 = 1$ for the $Y_2SiO_5$ phosphor and $SiO_2/Y_2O_3 = 2$ for the $Y_2Si_2O_7$ phosphor. However, in actual practice and synthesis of the phosphor, the ratio $SiO_2/Y_2O_3$ should be 1.0–1.2, preferably 1.1–1.2 for the $Y_2SiO_5$ phosphor and 2.0–2.5, preferably 2.2–2.5 for the $Y_2Si_2O_7$ phosphor. We have found through analysis by powder X-ray diffraction that an excessive amount of $SiO_2$ makes the synthesis easier, resulting in a higher luminous efficiency.

Figure 2:
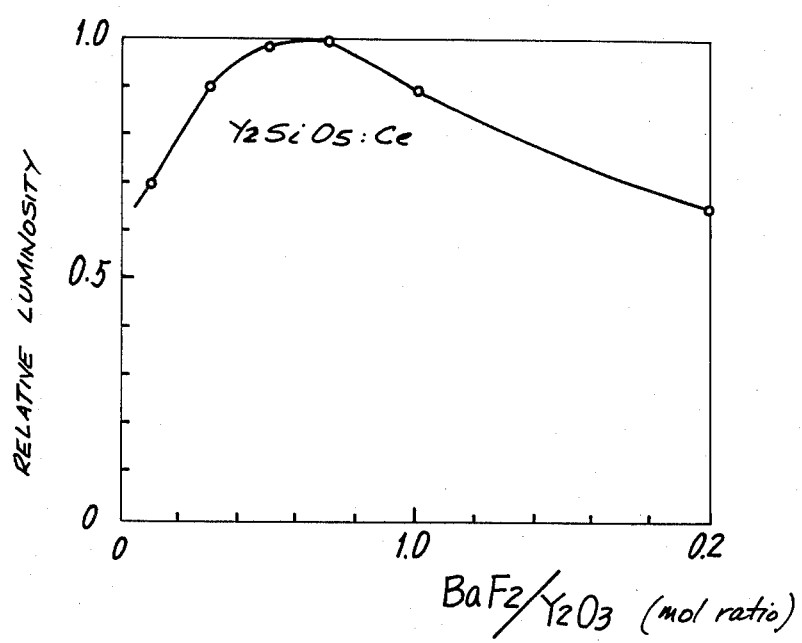
FIG. 2 shows the relationship between the relative luminosity graduated on the ordinate and the amount of $BaF_2$ added in firing $Y_2SiO_5:Ce$ graduated on the abscissa.
Figure 3:
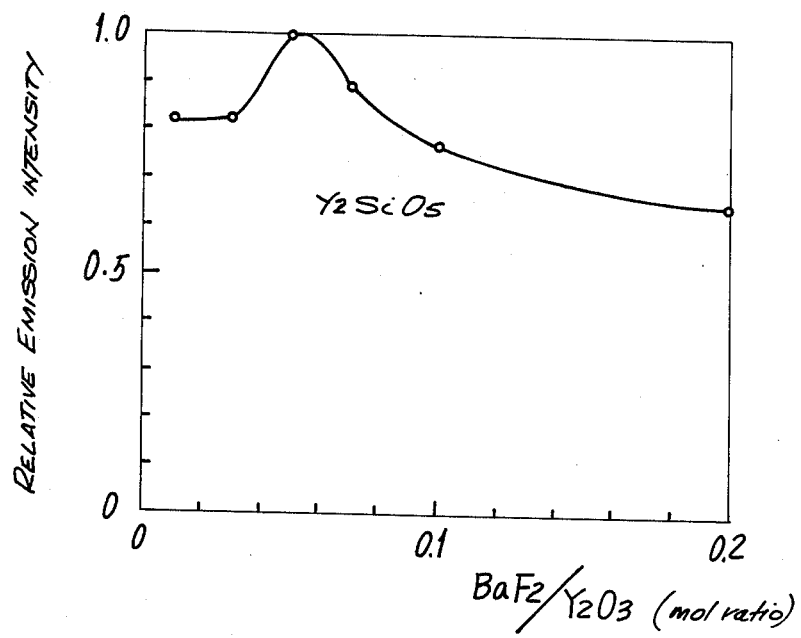
FIG. 3 shows the relationship between the relative emission intensity (herein defined as the value of peak height in the emission spectrum wave) graduated on the ordinate and the amount of $BaF_2$ added in firing $Y_2SiO_5:Ce$ graduated on the abscissa.

The effect of the amount of $BaF_2$ added during the firing of a $Y_2SiO_5$:Ce phosphor is shown in FIG. 2 and in FIG. 3, where the addition of $BaF_2$ in an amount of 0.01–0.2 mol per 1 mol of the $Y_2SiO_5$:Ce phosphor causes the above mentioned improved effect and the preferable range of addition is 0.03–0.1 mol per 1 mol of the phosphor and, further, the highest luminosity and the highest peak value of emission intensity are attained in the optimum range for $BaF_2$ of 0.05–0.07 mol per 1 mol of the phosphor. For the above-mentioned optimum range of $BaF_2$, the peak value of the luminosity of the present phosphor is 160% and the emission intensity of the present phosphor is 110% in comparison with those values of the conventional $Y_2SiO_5$:Ce phosphor fired with a $YF_3$ addition.

Figure 4:
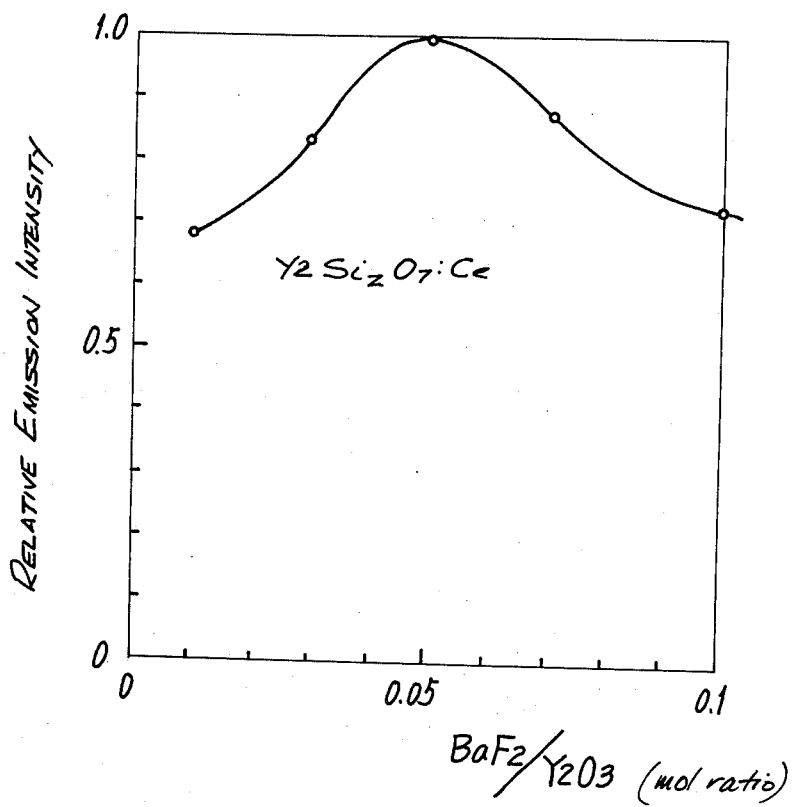
FIG. 4 shows the relationship between the relative emission intensity (defined as above) graduated on the ordinate and the amount of $BaF_2$ added in firing $Y_2Si_2O_7:Ce$ graduated on the abscissa.

The effect of the amount of $BaF_2$ added in firing $Y_2Si_2O_7$:Ce phosphor is shown in FIG. 4 where the addition of $BaF_2$ in an amount of 0.01–0.1 mol per 1 mol of the $Y_2Si_2O_7$:Ce phosphor causes the above-mentioned improved effect. The preferable range of $BaF_2$ addition is in an amount of 0.03–0.08 mol per 1 mol of the phosphor and, further, the highest peak value of emission intensity is attained at around the optimum amount of addition of approximately 0.05 mol per 1 mol of the phosphor.

For the above mentioned optimum amount of $BaF_2$, the peak value of the emission intensity of the present phosphor is 150 to 160% in comparison with the value of the conventional $Y_2Si_2O_7$:Ce phosphor fired without $BaF_2$.

Analysis of powder X-ray diffraction does not clearly show an imperfection of the lattice constant which would otherwise indicate the production of barium silicate or the intermixing of barium ions in the lattice.

Many additives, for instance fluoride compounds such as $AlF_3$, $MgF_2$, $CaF_2$, $SrF_2$, $LiF$, $ZnF_2$, and also compounds of barium, such as $BaCO_3$, $Ba(NO_3)_2$, $BaCl_2$ have been tested as a mineralizer of flux in firing the $Y_2SiO_5$ and $Y_2Si_2O_7$ phosphors. Among the above-mentioned tested compounds, none was found to improve the luminosities or emission intensities of the phosphors.

From the above-mentioned facts, the principle of the improvement herein described can be hypothetically explained as follows:

The improvement in the $Y_2Si_2O_7$:Ce phosphor is believed to be caused by the effect of $BaF_2$ as a mineralizer. While the improvement in the $Y_2SiO_5$:Ce is believed to be caused by the increase of emission intensity at around 450 nm wavelength (as shown by curve "a" of FIG. 1) where specific visual sensitivity of the eye is high, this improvement is attained presumably not only by the function of $BaF_2$ as a mineralizer but also by some intangible contribution of barium to the improvement of the emission. However, the importance of this observation is that the improvement is a direct result of the addition of $BaF_2$ only, and not by other substances.

In firing of the $Y_2SiO_5$:Ce phosphor, firing at a temperature of 1200°–1500° C. in the air or a slightly reducing atmosphere for 3 hours provides a good result. The length of firing is easily determined by the skilled operator; usually 3–4 hours will be sufficient. The emission intensity, herein defined as the value of the peak height in the emission spectrum curve, is the highest when the firing is at around 1300° C., but to give the peak of the emission intensity the firing temperature is dependent on the concentration of cerium. For instance, when 0.01 mol of Ce is added to 1 mol of phosphor, the peak is obtained by firing at around 1300° C, but when 0.03 mol of Ce is added to 1 mol of the phosphor, then the peak is obtained by firing at around 1400° C. The mol ratio of $CeO_2$ to $Y_2O_3$ is preferably 0.01 to 0.1 and more preferably 0.02 to 0.06. The slightly reducing atmosphere referred to may be, for example, nitrogen or another inert gas such as argon, containing 0.1 to 2.0 volume percent of hydrogen, as described in W. L. Wanmaker et al, Philips Res. Reports, Vol. 22, p. 355–366, 1976, or optionally, up to 5% hydrogen, as in certain of the following Examples.

As between the two firing conditions mentioned above, the latter one, namely firing at 1400° C. with the 0.03 mol Ce addition to 1 mol phosphor, results in a slightly higher luminosity, but in a lower peak value of emission intensity. An analysis by powder X-ray diffraction proved that a firing at over 1200° C. for 3 hours formed $Y_2SiO_5$ compound.

In the firing of the $Y_2Si_2O_7$ phosphor, firing at a temperature of 1260° to 1430° C. in the air or a slightly reducing atmosphere, as described above, for 3 to 4 hours provides a good result. Since the transition temperature from $\beta$-$Y_2Si_2O_7$ to $\alpha$-$Y_2Si_2O_7$ or to $\gamma$-$Y_2Si_2O_7$ compound is 1250° C. ± 10° C. or 1445° C. ± 10° C., respectively, the firing should be conducted at a temperature between 1260° C. and 1430° C.

In the following examples, 99.999% pure $Y_2O_3$, 99.999% pure $YF_3$ and 99.9% pure $CeO_2$ manufactured by Shinetsu Chemical Co., Ltd. of Japan, 99.999% pure $SiO_2$ manufactured by Mathey & Co., Ltd. of England and ultrapure $BaF_2$ manufactured by E. Merck A. G. of West Germany are used as the starting materials.

In the measurement of the luminosity, the calibrations for the relative luminosity curve are made by using a Kodak Wratten No. 106 filter and a photomultiplier of S-4 spectrum sensitivity.

EXAMPLE 1

In this Example, a phosphor is made from:

| | |
|---|---|
| Yttrium oxide ($Y_2O_3$) | 73.02 gr |
| Anhydrous silicon oxide ($SiO_2$) | 23.76 gr |
| Cerium oxide ($CeO_2$) | 3.44 gr |
| Barium Fluoride ($BaF_2$) | 2.89 gr |

The above-mentioned starting materials are powdered and mixed well in a bowl and then the mixture is placed in a platinum boat and heated in air at 1300° C. for 3 hours.

Figure 1:
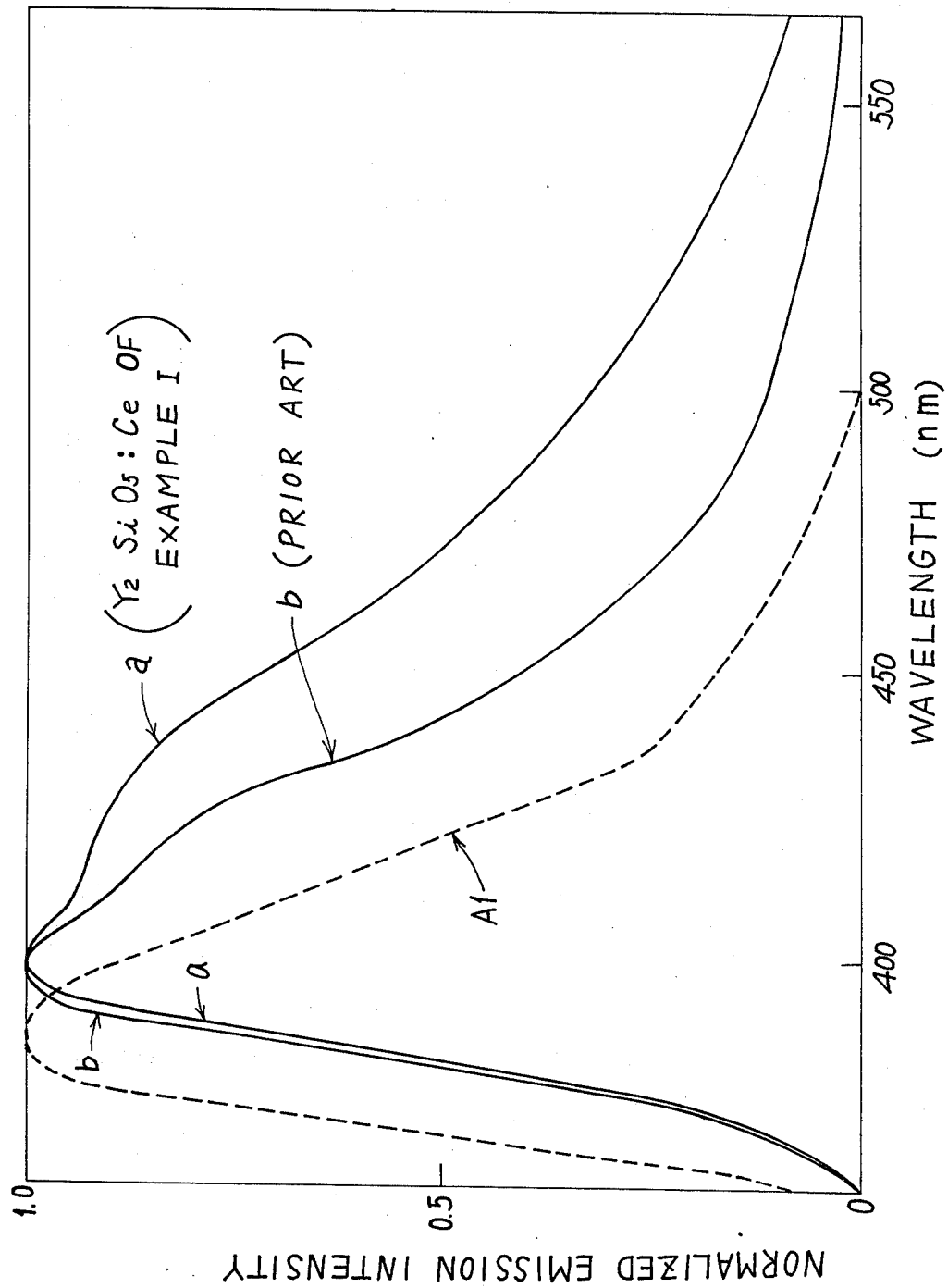
FIG. 1 shows spectrum distributions of the emission of $Y_2SiO_5:Ce$ phosphors at electron beam excitation wherein curve "a" indicates the distributions of the phosphor made by Example I of the present invention and curve "b" indicates the distributions of the phosphor made by a conventional method and materials. Curve "Al", shown in a dashed line, is transposed from U.S. Pat. No. 3,814,967 to Takata et al (FIG. 2 in which the ordinate is interpreted to indicate emission intensity) for purposes of comparison.

An analysis by powder X-ray diffraction proved that the phosphor made in this manner consisted mainly of $Y_2SiO_5$:Ce. The spectrum distribution of this phosphor is shown in FIG. 1 by curve "a". The peak value of the spectrum curve of this phosphor is almost equal to known phosphor of $Y_2Si_2O_5$:Ce that is fired with $YF_3$ as a mineralizer, and its luminosity is as high as 160% of that of that phosphor.

EXAMPLE 2

The starting materials of the Example 1 are powdered and mixed well in a bowl and then the mixture is placed in an alumina boat and heated at 1400° C. for 3 hours in a slightly reducing atmosphere of argon gas containing 5% hydrogen.

The phosphor made in this manner has the luminosity as high as 138% and the emission intensity at its peak as high as 110%, respectively, of those of the above-mentioned known $Y_2SiO_5$:Ce phosphor that is fired without $BaF_2$.

EXAMPLE 3

In this Example, a phosphor is made from:

| | |
|---|---|
| Yttrium oxide ($Y_2O_3$) | 223.58 gr |
| Anhydrous silicon dioxide ($SiO_2$) | 144.21 gr |
| Cerium oxide ($CeO_2$) | 3.44 gr |
| Barium Fluoride ($BaF_2$) | 8.76 gr |

The required starting materials are powdered and mixed well in a bowl and then the mixture is placed in a platinum boat and heated in the air at 1350° C for 1 hour. The product is again powdered and mixed in a bowl and heated at 1350° C. for 2 hours. Powder X-ray diffraction analysis proved that the phosphor made in this manner consisted of $Y_2Si_2O_7$:Ce. The peak value of the spectrum curve of this phosphor is as high as 150% of that of the conventional $Y_2Si_2O_7$:Ce phosphor that is fired without $BaF_2$.

EXAMPLE 4

The starting materials of the Example 3 are powdered and mixed well in a bow and then the mixture is placed in a graphite boat and heated at 1350° C. for 3 hours in a slightly reducing atmosphere of argon gas containing 5% hydrogen. The phosphor made in this manner has the emission intensity at its peak as high as 150% of that of the known $Y_2Si_2O_7$:Ce phosphor which was fired without $BaF_2$.

While the novel principles of the present invention have been described, it will be understood that various omissions, modifications and changes in these principles may be made by one skilled in the art without departing from the spirit and scope of the invention.

What is claimed is:

1. A method of increasing the emission intensity of a $Y_2SiO_5$:Ce phosphor at around the 450nm wavelength comprising adding $BaF_2$ to a mixture of $Y_2O_3$, $SiO_2$ and $CeO_2$, wherein the $BaF_2$ is added in an amount such that the $BaF_2/Y_2O_3$ mol ratio is 0.01 to 0.2 inclusive and wherein the $SiO_2/Y_2O_3$ mol ratio is 1.0 to 1.2 inclusive, and thereafter firing the $BaF_2$-containing mixture at a temperature of the order of 1200–1500° C in air or a reducing atmosphere of an inert gas containing up to 5% hydrogen to produce a cerium-activated phosphate phosphor exhibiting increased luminosity and emission intensity.

2. The method of claim 1 wherein the amount of $BaF_2$ added to the mixture is such that the ratio of $BaF_2/Y_2O_3$ is 0.03 to 0.1.

3. The method of claim 1 wherein the amount of $BaF_2$ added to the mixture is such that the ratio of $BaF_2/Y_2O_3$ is 0.05 to 0.07.

* * * * *